(12) United States Patent
Ye et al.

(10) Patent No.: US 11,369,092 B2
(45) Date of Patent: Jun. 28, 2022

(54) FEEDBACK FEEDING SYSTEM FOR POND RECIRCULATION WITH FUSION OF MACHINE VISION AND INFRARED DETECTION

(71) Applicant: Zhejiang University, Hangzhou (CN)

(72) Inventors: Zhangying Ye, Hangzhou (CN); Shengyu Hang, Hangzhou (CN); Yanci Wen, Hangzhou (CN); Jian Zhao, Hangzhou (CN); Songming Zhu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 163 days.

(21) Appl. No.: 16/996,807

(22) Filed: Aug. 18, 2020

(65) Prior Publication Data

US 2020/0375155 A1 Dec. 3, 2020

Related U.S. Application Data

(63) Continuation of application No. PCT/CN2020/072012, filed on Jan. 14, 2020.

(30) Foreign Application Priority Data

Apr. 11, 2019 (CN) .......................... 201910290977.4

(51) Int. Cl.
*A01K 61/85* (2017.01)
*A01K 61/95* (2017.01)
*H04N 5/33* (2006.01)
*G06T 7/246* (2017.01)
*A01K 61/80* (2017.01)
*A01K 61/10* (2017.01)

(52) U.S. Cl.
CPC .............. *A01K 61/85* (2017.01); *A01K 61/80* (2017.01); *A01K 61/95* (2017.01); *G06T 7/246* (2017.01); *H04N 5/33* (2013.01); *A01K 61/10* (2017.01)

(58) Field of Classification Search
CPC ........ A01K 61/85; A01K 61/95; A01K 61/80; A01K 61/10; G06T 7/246; H04N 5/33
USPC ......................................................... 382/173
See application file for complete search history.

(56) References Cited

FOREIGN PATENT DOCUMENTS

CN 107372267 A * 11/2017

\* cited by examiner

*Primary Examiner* — Wednel Cadeau

(57) ABSTRACT

Disclosed is a feedback feeding system pond recirculation with fusion of machine vision and infrared detection. Feeding strategies are provided according to the feeding behavior of fish in cooperative with machine vision technology and infrared sensing technology. The pond recirculating aquaculture is an open environment. The change of natural environment may affect the feedback signal of the fish feeding behavior provided by the machine vision due to the low visibility; or it may affect the feedback signal of the fish feeding behavior provided by the infrared detection because low temperature may decrease feeding intensity. The fusion of these two strategies can solve the problem of intelligent feeding strategies in the pond recirculating aquaculture mode.

4 Claims, 2 Drawing Sheets

FEEDBACK FEEDING SYSTEM FOR POND RECIRCULATION WITH FUSION OF MACHINE VISION AND INFRARED DETECTION

CROSS-REFERENCE TO RELATED APPLICATIONS

This application is a continuation of International Patent Application No. PCT/CN2020/072012, filed on Jan. 14, 2020, entitled "Feedback Feeding System for Pond Recirculation with Fusion of Machine Vision and Infrared Detection," which claims priority to China Patent Application No. 201910290977.4, filed on Apr. 11, 2019. The content of these identified applications are hereby incorporated by references.

TECHNICAL FIELD

The present disclosure relates to the technical field of aquaculture, in particular to a feedback feeding system pond recirculation with fusion of machine vision and infrared detection.

BACKGROUND

Fish and fish products, from fishing and aquaculture, are an essential source of protein and energy for humans and play an important role in human survival and development. With population growth and the degradation of the ecological environment, fishing has been unable to meet demand for fish resources, and aquaculture has become an important way to obtain fish products.

Aquaculture refers to the production activities including reproduction, cultivation and harvest of aquatic animals and plants under control. It can be roughly divided into extensive farming, semi-extensive farming and intensive farming. The first two methods of farming rely too much on the natural environment and can easily pollute the aquaculture water. Intensive farming usually uses the Recirculating Aquaculture System (RAS) for high dense culture. The pond recirculating aquaculture mode is a multidisciplinary and applied aquaculture method, which usually includes a raceway culture tank, a feeding system, an excrement collection system, and a water quality monitoring and purification system. With the increasing scarcity of water resources and environmental pollution, the development of the pond recirculating aquaculture mode has become important for aquaculture.

Precise feeding of fish is a problem in the pond recirculating aquaculture. Studies have shown that both hunger and overeating may cause disease outbreaks in breeding subjects. Secondly, feed cost is the main component of the entire aquaculture cost (more than 40%). Increasing feed utilization rate plays an important role in increasing breeding efficiency. In addition, residual feed also affects the water environment of the fish. Therefore, precise feeding according to the actual feeding needs of the breeding objects is of great significance to promote the growth of fish culture.

Currently, in the mode of pond recirculating aquaculture, it is common to feed either manually or mechanically by time and quantity. In manual feeding, the feeder may observe the desire of the cultured objects according to his/her experience and improve the feeding accuracy. However, it is time-consuming and laborious. While the regular and quantitative feeding saves labor costs, however, different fish needs different feeding amount and feeding time. Therefore, regular and quantitative feeding is not readily adapted for fish growth.

There are mainly two feeding methods, sling feeder and pneumatic feeder. Due to the popularization of recirculating aquaculture mode in recent years, orbital feeding machines have appeared. With the application and development of 3D modeling and simulation software, the various mechanisms of the feeding machines have been continuously optimized, and the performance greatly improved. However, optimization is only based on the change of the regular and quantitative feeding mode, and variable feeding based on the feeding behavior of the breeding objects.

The feeding behavior of shoals of fish is regular and is affected by natural environment. Therefore, according to the feedback of the feeding behavior of the shoals of fish, it is important to accurately judge the degree of hunger of the fish in order to control the feeding system in the pond recirculating aquaculture mode. Direct manual observation is used to determine the feeding behavior of shoals of fish in early research, which required a lot of human resources and was destructive and ignoring the welfare of the animal. Furthermore, only small areas could be detected and continuous monitoring and real-time feedback control could not be achieved.

SUMMARY OF THIS INVENTION

With the rapid development of computer vision and infrared sensing technology, intelligent feeding systems based on such technologies have gradually emerged in recent years and have received extensive attention from researchers due to their high accuracy and high degree of intelligence.

The present disclosure provides a feedback feeding system pond recirculation with the fusion of machine vision and infrared detection. Feeding strategies are provided according to the feeding behavior of fish in cooperation with machine vision technology and infrared sensing technology. The pond recirculating aquaculture is an open environment. The change of natural environment, e.g. light, etc., may affect the feedback signal of the fish feeding behavior provided by the machine vision due to the low visibility, or it may affect the feedback signal of the fish feeding behavior provided by the infrared detection because low temperature may decrease feeding intensity. The fusion of these two strategies can solve the problem of intelligent feeding strategies in the pond recirculating aquaculture mode.

The present disclosure provides a feedback feeding system pond recirculation with the fusion of machine vision and infrared detection. The system is cost-effective and accurate in feeding, realizing the intelligent feeding strategies in pond recirculating aquaculture.

The feedback feeding system pond recirculation with fusion of machine vision and infrared detection comprises a rack, a controller and a feeder. The rack is mounted on the pond shore at the inlet of the pond to recirculate the aquaculture pond water. The controller and the feeder are both mounted on the rack and located over the water.

The controller comprises a control box, a development board, a night vision fisheye wide-angle camera, a night vision camera infrared fill light, an infrared sensor, and a mechanical infrared sensor assister. The development board is arranged within the control box and is connected to the night vision fisheye wide-angle camera and the infrared sensor. The night vision fisheye wide-angle camera is mounted on the bottom of the control box and is connected to the night vision camera infrared fill light to provide an image stream of the fish feeding behavior. The development board is configured to calculate the intensity $E_K$ of fish feeding behavior based on the reflective area of the water surface according to the change characteristics of the reflective area of the pond recirculating aquaculture pond reflected by the image stream. Two night vision camera infrared fill lights are arranged on both sides of the night vision fisheye wide-angle camera, respectively. Four infrared sensors are mounted within the control box, and each two adjacent infrared sensors form an angle of 90°. The infrared sensors with the mechanical infrared sensing assister cooperatively provide monopulse signal to the development board. The development board is configured to calculate the intensity $E_J$ of fish feeding behavior based on the intensity of the water fluctuation according to the intensity of the water fluctuation of the pond recirculating aquaculture pond reflected by the monopulse signal.

The feeder comprises a feed storage pin, a screw conveyor, a down pipe, a feed distributing pan and a motor. The feed in the feed storage pin is capable of being conveyed to the down pipe under the drive of the motor through the screw conveyor. The feed distributing pan is capable of distributing the feed to the pond recirculating aquaculture pond evenly. The motor is connected to the development board. The development board is configured to calculate the intensity E of the fish feeding behavior according to the obtained $E_K$ and $E_J$:

$$E=(1-\varepsilon)E_K+\varepsilon E_J$$

wherein, ε represents the coordination coefficient of feeding strategies. When E is greater than the present feeding strategy threshold G, the development board controls the rotation of the motor to starting feeding.

In some embodiments, the mechanical infrared sensing assistor comprises a mechanical infrared sensing auxiliary joint, an infrared sensing feedback adjustment knob, and a mechanical infrared sensing auxiliary rod. The mechanical infrared sensing auxiliary joint comprises of an upper sub-joint and a lower sub-joint. The lower sub-joint is provided with a hole thereon. The mechanical infrared sensing auxiliary rod is inserted into the hole from top to bottom. The upper end is located inside the mechanical infrared sensing auxiliary joint. The infrared sensing feedback adjustment knob is installed on the upper sub-joint. The end of the feedback adjustment knob is abutted against the upper end of the mechanical infrared sensing auxiliary rod. The swing amplitude of the mechanical infrared sensing auxiliary rod caused by the fish feeding behavior is controlled by the tensioning effect to adjust the infrared sensing feedback.

In some embodiments, the calculation of $E_K$ is detailed as follows.

a. The night vision fisheye wide-angle camera transmits the real-time image stream of the fish feeding behavior to the development board, wherein the image stream is RGB space.

b. The development board converts the image stream to HSV space.

c. The reflective area of the water surface of the pond recirculating aquaculture pond in the image stream is extracted from the following expression:

$$f(x,y)=\begin{cases}1 & (I_s(x,y)<T_s \text{ and } I_v(x,y)>T_v)\\ 0 & \text{others}\end{cases}$$

wherein, $I_s(x, y)$ and $I_v(x, y)$ represents the saturation and brightness of the image at (x, y), respectively. $T_s$ and $T_s$ represents the saturation threshold and brightness threshold, respectively. f(x, y) represents the value of pixel (x, y) after binarization processing.

d. The characteristics information of the fish feeding behavior in the image stream is extracted by Lucas-Kanade optical flow algorithm. The velocity change amplitude of the motion vector in two adjacent image streams are calculated according to the following expression:

$$v=\frac{\Sigma_{x,y}|f(x,y)|}{N}$$

wherein, (x, y) represents the coordinator of the reflective area of the current frame; N represents the total number of motion vectors in the current frame.

e. The velocity change amplitude distribution of the motion vector in two adjacent image streams are calculated. The distribution probability of different velocity intervals according to the following expression:

$$P(i)=(H(i)/N)(0\leq i\leq m)$$

wherein, m represents the number of intervals v being divided into; H(i) and P(i) represents the number and probability of motion vectors falling into a certain speed interval.

f. The information entropy is used to measure the degree of irregularity in the distribution probability of the reflective area change on the water surface of the pond recirculating aquaculture pond, so as to realize the analysis of the degree of irregularity in the fish feeding behavior. The expression is as follows:

$$C_E=\Sigma_{j=1}^m P(j)\log_2(P(j))$$

g. $E_K$ is calculated by the following expression:

$$E_K=L\times C_E\times v^2=-L\sum_{j=1}^m P(j)\times\left(\frac{\Sigma_{x,y}|f(x,y)|}{N}\right)^2$$

wherein, L is the light correction factor.

In some embodiments, the calculation of $E_J$ is detailed as follows.

a. The water fluctuation of the pond recirculating aquaculture pond caused by the feeding activity of the shoals of fish causes the mechanical infrared sensing auxiliary rod to rotate irregularly in the mechanical infrared sensing auxiliary joint.

b. The infrared sensors installed inside the control box converts the irregular rotation into a monopulse signal, marked with the following expressions:

$$S(i)=\begin{cases}\ln s_j, & \Sigma_0^t s_j > M\\ 0 & \text{others}\end{cases} i=1,2,3,4; j=1,2,3\ldots\ldots,t$$

wherein, S(i) represents the sensing state of the i-th sensor of the four infrared sensors; t represents the time period in seconds; $s_j$ represents the number of monopulse of a single infrared sensor per second in period t; M represents sensing threshold of the infrared sensor.

c. $E_J$ is calculated by the following expressions:

$$E_J = F \prod_{i=1}^{4} S(i)$$

wherein, F represents the water fluctuation correction coefficient.

Compared with the prior art, the present disclosure at least has the following advantages.

The feedback feeding system pond recirculation with the fusion of machine vision and infrared detection is feasible and intelligent, and can realize intelligent feeding for pond recirculation. The pond recirculating aquaculture is an open environment. The change of natural environment, such as light, may affect the feedback signal of the fish feeding behavior provided by the machine vision due to the low visibility; or it may affect the feedback signal of the fish feeding behavior provided by the infrared detection because low temperature may decrease feeding intensity. The fusion of these two strategies can solve the problem of intelligent feeding strategies in the pond recirculating aquaculture mode.

DETAILED DESCRIPTION OF THE DISCLOSURE

The present disclosure will be described in detail below in conjunction with the drawings. The following specific embodiments are used to illustrate the present invention, but not to limit the scope of the present invention.

The present disclosure provides a feedback feeding system pond recirculation with fusion of machine vision and infrared detection aiming to solve the problem in the prior art. The system is cost-effective and accurate in feeding, realizing the intelligent feeding strategies in pond recirculating aquaculture.

The present disclosure is described as follows.

The present disclosure determines the intensity E of the fish feeding behavior in two aspects. On the one hand, the intensity of the fish feeding behavior is determined by the change characteristics of the reflective area of the water surface of the pond recirculating aquaculture pond. In the present disclosure, $E_K$ represents the fish feeding behavior based on the reflective area of the water surface. On the other hand, the intensity of the fish feeding behavior is determined by the water fluctuation of the pond recirculating aquaculture pond. In the present disclosure, $E_J$ represents the fish feed behavior based on the intensity of the water fluctuation. The fusion of these two aspects will affect the final intelligent feeding strategy. When the reflective area of the water surface caused by the natural environment is not clear, the generation of feeding strategy relies more on the infrared sensing feedback. When the water fluctuation caused by low temperature environment, the generation of feeding strategy relies more on the machine vision.

More detail embodiments will be described with the following examples.

Figure 1:
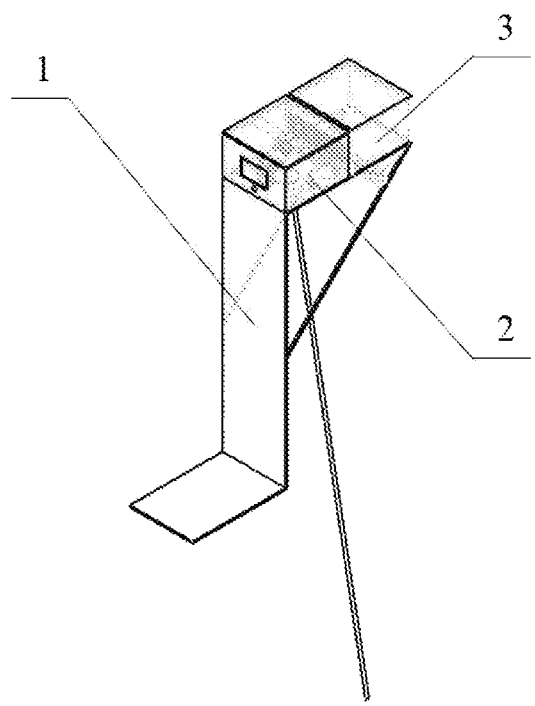
FIG. 1 is a schematic diagram of a feeding system according to one embodiment of the present disclosure.

As shown in FIG. 1, the feeding system with fusion of machine vision and infrared detection comprises a rack 1, a controller 2 and a feeder 3.

The rack 1 is mounted on pond shore of the inlet of the pond recirculating aquaculture pond. The rack 1 provides a stable work environment for the controller 2 and the feeder 3 which are mounted thereon.

Figure 2:
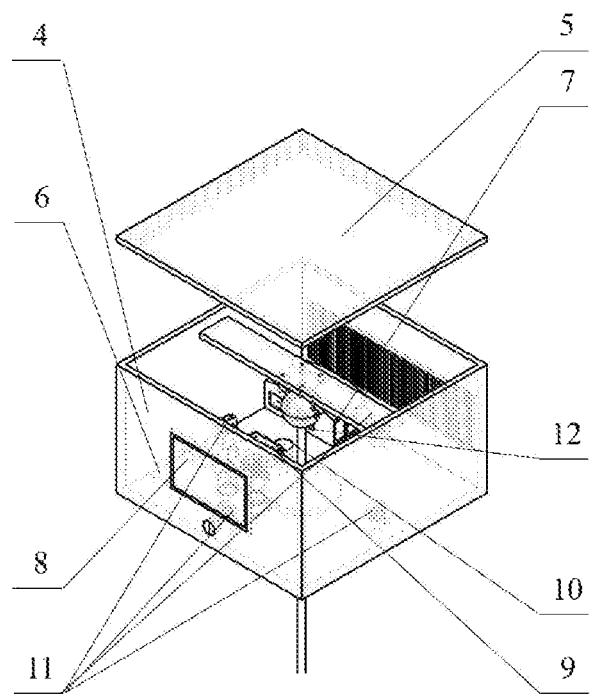
FIG. 2 is a schematic diagram of a controller of the feeding system according to one embodiment of the present disclosure.
Figure 3:
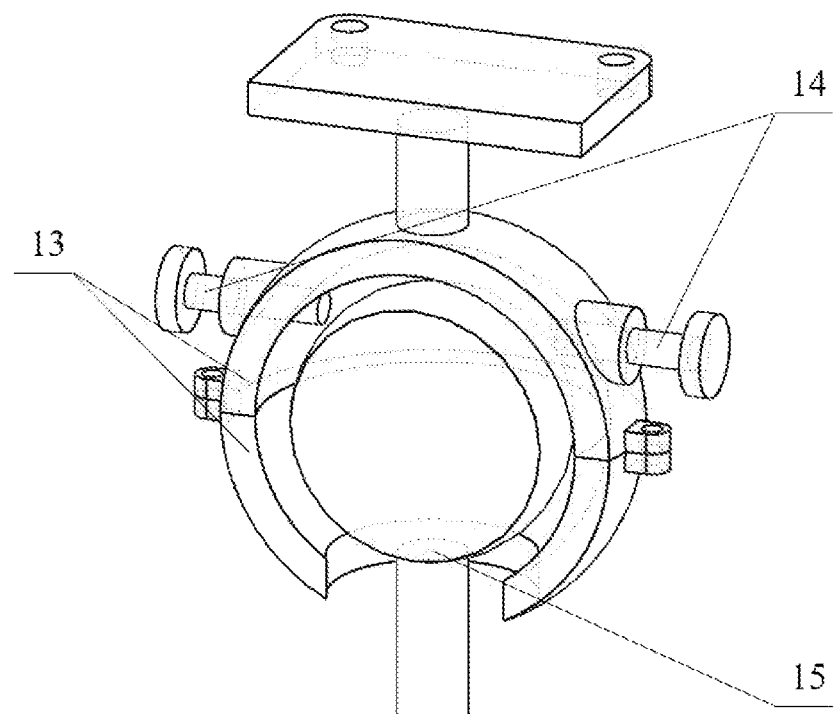
FIG. 3 is a cross-sectional diagram of a mechanical infrared sensing assistor of the feeding system according to one embodiment of the present disclosure.
Figure 4:
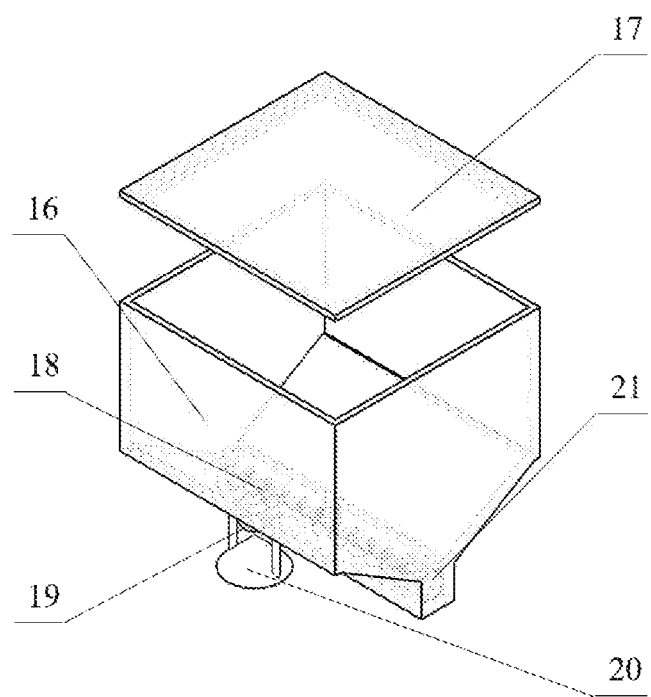
FIG. 4 is a schematic diagram of a feeder of the feeding system according to one embodiment of the present disclosure.

As shown in FIG. 2, the controller 2 comprises a control box 4, a control box cover 5, a power supply 6, a development board 7 which is Raspberry Pi® 3B+, a 7-inch HDMI capacitive touch screen 8, a night vision fisheye wide-angle camera 9, a night vision camera infrared fill light 10, an infrared sensor 11, and a mechanical infrared sensor assister 12. The top of the control box 4 is receivable for the control box cover 5. The control box 4 can provide a dry and clean work environment for the power supply 6, the development 7, the touch screen 8, the night vision fisheye wide-angle camera 9, the night vision camera infrared fill light 10, the infrared sensor 11 and the mechanical infrared sensing assistor 12. The power supply 6 is arranged within the control box 4 to provide electric power for the development 7, the touch screen 8, the night vision fisheye wide-angle camera 9, the night vision camera infrared fill light 10 and the infrared sensor 11. The development board 7 is arranged within the control box 4 and is connected to the touch screen 8, the night vision fisheye wide-angle camera 9 and the infrared sensor 11. The fusion of the machine vision and the infrared detection is the core electrical device of the feeding system. The touch screen 8 is installed on the on the main viewing surface of the control box 4, and displays the interface of the feeding system. The touch screen 8 allows operation on the system, and the interface thereof may be programmed by web. Varies of smart devices (e.g. mobile phone, pad and computer, etc.) in local network can be remotely controlled by entering the Raspberry Pi IP address, which is convenient for users to operate and read. The night vision fisheye wide-angle camera 9 is installed at the bottom of the control box 4 and connected to the night vision camera infrared fill light 10 to provide the development board 7 with image streams of fish feeding behavior. The development board 7 calculates $E_K$ according to the change characteristics of the reflective area of the pond recirculating aquaculture pond reflected by the image stream, and then cooperates with the infrared sensor feedback feeding strategy to control the working state of the screw conveyor 18 in the feeder 3 to achieve the intelligent feeding. The night vision camera infrared fill lights 10 are connected on both sides of the night vision fisheye wide-angle camera 9 to provide a stable background for the image stream of the collected fry.

The night vision fisheye wide-angle camera is mounted on the bottom of the control box, and is connected to the night vision camera infrared fill light to provide image stream of the fish feeding behavior. The development board is configured to calculates the intensity $E_K$ of fish feeding behavior based on the reflective area of the water surface according to the change characteristics of the reflective area of the pond recirculating aquaculture pond reflected by the image stream. Two night vision camera infrared fill lights are arranged on both sides of the night vision fisheye wide-angle camera, respectively. Four infrared sensors are mounted within the control box, and each two adjacent infrared sensors form an angle of 90°. The infrared sensors are cooperative with the mechanical infrared sensing assister to provide monopulse signal to the development board. The development board is configured to calculate the intensity $E_J$ of fish feeding behavior based on the intensity of the water fluctuation according to the intensity of the water fluctuation of the pond recirculating aquaculture pond reflected by the monopulse signal.

When the intensity of the fish feeding behavior is determined according to the change characteristics of the reflective area of the water surface of the pond recirculating aquaculture pond, the calculation of $E_K$ is detailed as follows.

a. The night vision fisheye wide-angle camera 9 transmits the real-time image stream of the fish feeding behavior to the development board 7, wherein the image stream is RGB space.

b. The development board 7 converts the image stream to HSV space.

c. The reflective area of the water surface of the pond recirculating aquaculture pond in the image stream is extracted from the following expression:

$$f(x, y) = \begin{cases} 1 & (I_s(x, y) < T_s \text{ and } I_v(x, y) > T_v) \\ 0 & \text{others} \end{cases}$$

wherein, $I_s(x, y)$ and $I_v(x, y)$ represents the saturation and brightness of the image at (x, y), respectively. $T_s$ and $T_s$ represents the saturation threshold and brightness threshold, respectively. f(x, y) represents the value of pixel (x, y) after binarization processing.

d. The characteristics information of the fish feeding behavior in the image stream is extracted by Lucas-Kanade optical flow algorithm. The velocity change amplitude of the motion vector in two adjacent image streams are calculated according to the following expression:

$$v = \frac{\Sigma_{x,y}|f(x, y)|}{N}$$

wherein, (x, y) represents the coordinator of the reflective area of the current frame; N represents the total number of motion vectors in the current frame.

e. The velocity change amplitude distribution of the motion vector in two adjacent image streams are calculated. The distribution probability of different velocity intervals according to the following expression:

$$P(i)=(H(i)/N)(0 \leq i \leq m)$$

wherein, m represents the number of intervals v being divided into; H(i) and P(i) represents the number and probability of motion vectors falling into a certain speed interval.

f. The information entropy is used to measure the degree of irregularity in the distribution probability of the reflective area change on the water surface of the pond recirculating aquaculture pond, so as to realize the analysis of the degree of irregularity in the fish feeding behavior. The expression is as follows:

$$C_E = \Sigma_{j=1}^{m} P(j) \log_2(P(j))$$

g. $E_K$ is calculated by the following expression:

$$E_K = L \times C_E \times v^2 = -L \sum_{j=1}^{m} P(j) \times \left(\frac{\Sigma_{x,y}|f(x, y)|}{N}\right)^2$$

wherein, L is the light correction factor.

In some embodiments, the calculation of $E_J$ is detailed as follows.

a. The water fluctuation of the pond recirculating aquaculture pond caused by the feeding activity of the shoals of fish causes the mechanical infrared sensing auxiliary rod 15 to rotate irregularly in the mechanical infrared sensing auxiliary joint 13.

b. The infrared sensors 11 installed inside the control box 4 converts the irregular rotation into a monopulse signal, marked with the following expressions:

$$S(i) = \begin{cases} \ln s_j, & \Sigma_0^t s_j > M \\ 0 & \text{others} \end{cases} \quad i = 1, 2, 3, 4; j = 1, 2, 3... ..., t$$

wherein, S(i) represents the sensing state of the i-th sensor of the four infrared sensors; t represents the time period in seconds; $s_j$ represents the number of monopulse of a single infrared sensor per second in period t; M presents sensing threshold of the infrared sensor 11. In the present disclosure, four infrared sensors 11 are installed on the infrared sensor rack within the control box 4, and two adjacent infrared sensors 11 form a 90° angle.

c. $E_j$ is calculated by the following expressions:

$$E_J = F \prod_{i=1}^{4} S(i)$$

wherein, F represents the water fluctuation correction coefficient.

Feeding strategies are provided according to the feeding behavior of fish in cooperative with machine vision technology and infrared sensing technology. The calculation of E plays an important role. According to the obtained $E_K$ and $E_J$, the intensity E of fish feeding behavior is calculated as follows:

$$E=(1-\varepsilon)E_K+\varepsilon E_J$$

wherein, ε represents the coordination coefficient of feeding strategies. When E is greater than the present feeding strategy threshold G, the development board controls the rotation of the motor to starting feeding.

The foregoing are only specific embodiments of the present disclosure, and various changes and modifications made without departing from the concept and scope of the present disclosure, and all equivalent technical solutions also belong to the scope of the present invention.

What is claimed is:

1. A feeding system, comprising a rack configured to mount at an inlet of a pond on a pond shore, a controller and a feeder mounted on the rack and configured to be located over the pond;

wherein the controller comprises a control box, a development board, a night vision fisheye wide-angle camera, a plurality of night vision camera infrared fill lights, a plurality of infrared sensors, and a mechanical infrared sensor assister; the development board is arranged within the control box, and is connected to the night vision fisheye wide-angle camera and the infrared sensor; the night vision fisheye wide-angle camera is mounted on a bottom of the control box, and is connected to the night vision camera infrared fill light to provide an image stream of the fish feeding behavior; the development board is configured to calculate intensity $E_K$ of fish feeding behavior based on a reflective area of a water surface according to change characteristics of the reflective area reflected by the image stream; two night vision camera infrared fill lights are arranged on both sides of the night vision fisheye wide-angle camera, respectively; four infrared sensors are mounted within the control box, and each two adjacent infrared sensors form an angle of 90°; the infrared sensors together with the mechanical infrared sensing assister provide monopulse signals to the development board; the development board is configured to calculate intensity $E_J$ of fish feeding behavior based on intensity of the water fluctuation according to intensity of water fluctuation of the pond reflected by the monopulse signals;

the feeder comprises a feed storage pin, a screw conveyor, a down pipe, a feed distributing pan and a motor; the feed in the feed storage pin is capable of being conveyed to the down pipe under the drive of the motor through the screw conveyor; the feed distributing pan is capable of distributing the feed to the pond recirculating aquaculture pond evenly; the motor is connected to the development board; the development board is configured to calculate intensity E of the fish feeding behavior according to the obtained $E_K$ and $E_J$:

$$E=(1-\varepsilon)E_K+\varepsilon E_J$$

wherein, ε represents the coordination coefficient of feeding strategies; when E is greater than the present feeding strategy threshold G, the development board controls the rotation of the motor to starting feeding.

2. The feeding system according to claim 1, wherein the mechanical infrared sensing assistor comprises a mechanical infrared sensing auxiliary joint, an infrared sensing feedback adjustment knob, and a mechanical infrared sensing auxiliary rod; the mechanical infrared sensing auxiliary joint comprises an upper sub-joint and a lower sub-joint; the lower sub-joint is provided with a hole thereon; the mechanical infrared sensing auxiliary rod is inserted into the hole from top to bottom; the upper end is located inside the mechanical infrared sensing auxiliary joint; the infrared sensing feedback adjustment knob is installed on the upper sub-joint; the end of the feedback adjustment knob is abutted against the upper end of the mechanical infrared sensing auxiliary rod; the swing amplitude of the mechanical infrared sensing auxiliary rod caused by the fish feeding behavior is controlled by the tensioning effect to adjust the infrared sensing feedback.

3. The feeding system according to claim 1, wherein $E_K$ is calculated by the following steps:
 a. transmitting, by the night vision fisheye wide-angle camera, the real-time image stream of the fish feeding behavior to the development board, wherein the image stream is RGB space;
 b. converting, by the development board, the image stream to HSV space;
 c. extracting the reflective area of the water surface of the pond recirculating aquaculture pond in the image stream from the following expression:

$$f(x, y) = \begin{cases} 1 & (I_s(x, y) < T_s \text{ and } I_v(x, y) > T_v) \\ 0 & \text{others} \end{cases}$$

wherein, $I_s(x, y)$ and $I_v(x, y)$ represents the saturation and brightness of the image at (x, y), respectively; $T_s$ and $T_s$ represents the saturation threshold and brightness threshold, respectively; f(x, y) represents the value of pixel (x, y) after binarization processing;

d. extracting the characteristics information of the fish feeding behavior in the image stream by Lucas-Kanade optical flow algorithm; the velocity change amplitude of the motion vector in two adjacent image streams are calculated according to the following expression:

$$v = \frac{\Sigma_{x,y}|f(x, y)|}{N}$$

wherein, (x, y) represents the coordinator of the reflective area of the current frame; N represents the total number of motion vectors in the current frame;

e. calculating the velocity change amplitude distribution of the motion vector in two adjacent image streams are calculated; the distribution probability of different velocity intervals according to the following expression:

$$P(i)=(H(i)/N)(0 \le i \le m)$$

wherein, m represents the number of intervals v being divided into; H(i) and P(i) represents the number and probability of motion vectors falling into a certain speed interval;

f. measuring, based on the information entropy, the degree of irregularity in the distribution probability of the reflective area change on the water surface of the pond recirculating aquaculture pond; the expression is as follows:

$$C_E=\Sigma_{j=1}^{m}P(j)\log_2(P(j))$$

g. calculating $E_K$ by the following expression:

$$E_K = L \times C_E \times v^2 = -L \sum_{j=1}^{m} P(j) \times \left(\frac{\Sigma_{x,y}|f(x, y)|}{N}\right)^2$$

wherein, L is the light correction factor.

4. The feeding system according to claim 1, $E_J$ is calculated by the following steps:
 a. detecting irregulate rotation of the mechanical infrared sensing auxiliary joint caused by water fluctuation of the pond recirculating aquaculture pond caused by feeding activity of shoals of fish;
 b. converting, by the infrared sensors installed inside the control box, the irregular rotation into a monopulse signal, marked with the following expressions:

$$S(i) = \begin{cases} \ln s_j, & \Sigma_0^t s_j > M \\ 0 & \text{others} \end{cases} \quad i = 1, 2, 3, 4; j = 1, 2, 3\ldots\ldots, t$$

wherein, S(i) represents the sensing state of the i-th sensor of the four infrared sensors; t represents the time period in seconds; $s_j$ represents the number of monopulse of a single infrared sensor per second in period t; M presents sensing threshold of the infrared sensor;

c. calculating $E_J$ by the following expressions:

$$E_J = F\prod_{i=1}^{4} S(i)$$

wherein, F represents the water fluctuation correction coefficient.

* * * * *